(12) United States Patent
Wu

(10) Patent No.: US 12,074,990 B2
(45) Date of Patent: Aug. 27, 2024

(54) DATABASE MULTI-AUTHENTICATION METHOD AND SYSTEM, TERMINAL, AND STORAGE MEDIUM

(71) Applicant: INSPUR SUZHOU INTELLIGENT TECHNOLOGY CO., LTD., Jiangsu (CN)

(72) Inventor: Biaoqiang Wu, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/250,935

(22) PCT Filed: Sep. 30, 2021

(86) PCT No.: PCT/CN2021/122285
§ 371 (c)(1),
(2) Date: Apr. 27, 2023

(87) PCT Pub. No.: WO2022/105462
PCT Pub. Date: May 27, 2022

(65) Prior Publication Data
US 2023/0412399 A1 Dec. 21, 2023

(30) Foreign Application Priority Data
Nov. 17, 2020 (CN) .......................... 202011288784.4

(51) Int. Cl.
*H04L 9/32* (2006.01)
*H04L 9/08* (2006.01)
*H04L 9/30* (2006.01)

(52) U.S. Cl.
CPC .......... *H04L 9/3268* (2013.01); *H04L 9/0869* (2013.01); *H04L 9/3073* (2013.01)

(58) Field of Classification Search
None
See application file for complete search history.

(56) References Cited

U.S. PATENT DOCUMENTS 6,816,968 B1 * 11/2004 Walmsley ............... G06F 21/77
713/168
9,118,467 B2 * 8/2015 Maletsky .............. H04L 9/3268
(Continued)

FOREIGN PATENT DOCUMENTS

| CN | 103929306 A | 7/2014 |
|---|---|---|
| CN | 104378206 A | 2/2015 |

(Continued)

OTHER PUBLICATIONS

International Search report for PCT/CN2021/122285 mailed on Dec. 22, 2021.

(Continued)

*Primary Examiner* — Bassam A Noaman
(74) *Attorney, Agent, or Firm* — Dennemeyer & Associates LLC; Victoria Friedman

(57) ABSTRACT

Provided is a database multi-authentication method and system, a terminal, and a storage medium. The method comprises: initializing a hardware authentication certificate carrier by means of a programming interface, and storing a public key of the hardware authentication certificate carrier and a user certificate public name; taking the user certificate public name as a database user name, and generating a standard message digest value; receiving an authentication request sent from a client, and returning an initial random number to the client; receiving a signature random number sent from the client, and using the public key to decrypt the signature random number to obtain a random number; in response to determining that the random number is consistent with the initial random number, acquiring an message digest value, and in response to determining that the mes- (Continued)

sage digest value is consistent with the standard message digest value, determining that the client passes the authentication.

18 Claims, 3 Drawing Sheets

(56) References Cited

U.S. PATENT DOCUMENTS

| | | | |
|---|---|---|---|
| 2003/0114190 A1* | 6/2003 | Want | H04W 12/08 |
| | | | 455/410 |
| 2008/0120504 A1* | 5/2008 | Kirkup | H04L 9/003 |
| | | | 713/176 |
| 2014/0281554 A1 | 9/2014 | Maletsky et al. | |
| 2017/0223005 A1* | 8/2017 | Birgisson | H04L 63/083 |
| 2019/0342751 A1* | 11/2019 | Li | H04L 63/061 |
| 2021/0028947 A1* | 1/2021 | Pan | H04L 9/3247 |

FOREIGN PATENT DOCUMENTS

| | | |
|---|---|---|
| CN | 107979579 A | 5/2018 |
| CN | 108092776 A | 5/2018 |
| CN | 108881222 A | 11/2018 |
| CN | 109728909 A | 5/2019 |
| CN | 112491843 A | 3/2021 |

OTHER PUBLICATIONS

Search report for Chinese application 202011288784.4 filed Nov. 17, 2020.

* cited by examiner

DATABASE MULTI-AUTHENTICATION METHOD AND SYSTEM, TERMINAL, AND STORAGE MEDIUM

CROSS-REFERENCE TO RELATED APPLICATIONS

This is a 35 U.S.C. 371 National Stage Patent Application of International Application No. PCT/CN2021/122285, filed Sep. 30, 2021, which claims priority to Chinese application 202011288784.4, filed Nov. 17, 2020, each of which is hereby incorporated by reference in its entirety.

TECHNICAL FIELD

The present disclosure relates to the technical field of database authentication, and in particular, relates to a database multi-authentication method and system, a terminal and a storage medium.

BACKGROUND

With the continuous advancement of informatization, the security of data and the reliability of business operation are becoming more and more important. Identity authentication is taken as legitimate authentication of the user logging in to the database, all information in the world of computer networks, including user identity information, is represented by a specific set of data, the computer may only recognize the user's digital identity, and all the authorization to the user is also authorization to the digital identity of the user.

How to ensure that the operator who operates with a digital identity is the legal owner of the digital identity, that is to say, to ensure that the physical identity of the operator corresponds to the digital identity, identity authentication is to solve this problem. As the first gateway to protect network assets, identity authentication plays a pivotal role.

In the related art, PostgreSQL supports one authentication mode, most authentication modes are MD5 passwords which are not secure, and thus there is a risk of password leakage.

Summary

According to a first aspect, the embodiments of the present disclosure provide a database multi-authentication method, including:
  initializing a hardware authentication certificate carrier by means of a programming interface, and storing a public key of the hardware authentication certificate carrier and a user certificate public name into a server end database;
  taking the user certificate public name as a database user name, and calculating the database user name by means of a message digest algorithm to generate a standard message digest value of the database user name;
  receiving an authentication request sent from a client and verifying a user certificate in the authentication request, and returning an initial random number to the client after the verification is passed;
  receiving a signature random number sent from the client, and using the public key to decrypt the signature random number to obtain a random number;
  in response to determining that the random number is consistent with the initial random number, acquiring a message digest value of a client user name on the basis of determining that the random number is consistent with the initial random number, and in response to determining that the message digest value of the client user name is consistent with the standard message digest value, determining that the client passes the authentication on the basis of determining that the message digest value of the client user name is consistent with the standard message digest value.

In some embodiments, initializing a hardware authentication certificate carrier by means of a programming interface includes:
  inputting user information into an authentication management function of the hardware authentication certificate carrier, and logging in to the authentication management function;
  generating a key pair including a private key and a public key by using the authentication management function, and storing the private key into a storage medium of the hardware authentication certificate carrier;
  generating a user certificate by using a certificate generating tool according to the key pair;
  specifying an administrator account of the hardware authentication certificate carrier, and setting a maximum number of attempts for an administrator and a user to log in to the authentication management function.

In some embodiments, an authentication request sent by the client is generated through the following steps:
  identifying, by the client, a hardware authentication certificate carrier;
  inputting, by the client, user information into the hardware authentication certificate carrier to log in to the hardware authentication certificate carrier;
  reading, by the client, the user certificate from the hardware authentication certificate carrier, and generating the authentication request according to the user certificate.

In some embodiments, receiving an authentication request sent from a client, verifying a user certificate in the authentication request, and returning an initial random number to the client after the verification is passed include:
  extracting a user certificate from the authentication request, and judging whether the user certificate is a valid user certificate issued by a root certificate of a server end;
  in response to determining that the user certificate is a valid user certificate issued by the root certificate of the server end, and generating a random number with a specified number of digits on the basis of determining that the user certificate is a valid user certificate issued by the root certificate of the server end, sending the random number to the client, and storing the random number into a memory of the database server end as an initial random number; and
  in response to determining that the user certificate is not the valid user certificate issued by the root certificate of the server end, determining that an authentication fails on the basis of determining that the user certificate is not the valid user certificate issued by the root certificate of the server end.

In some embodiments, in response to determining that the random number is consistent with the initial random number, acquiring a message digest value of a client user name on the basis of determining that the random number is consistent with the initial random number includes:
  after verification of consistency between the random number and the initial random number is passed, acquiring a user certificate public name read by the client from the hardware authentication certificate carrier;

calculating a message digest value of the user certificate public name by using a message digest algorithm.

According to a second aspect, the embodiments of the present disclosure provide a database multi-authentication system, including:

an initial setting unit, configured to initialize a hardware authentication certificate carrier by means of a programming interface, and store a public key of the hardware authentication certificate carrier and a user certificate public name into a server end database;

a local setting unit, configured to use the user certificate public name as a database user name, and calculate the database user name by means of a message digest algorithm to generate a standard message digest value of the database user name;

a certificate verifying unit, configured to receive an authentication request sent from a client and verify a user certificate in the authentication request, and return an initial random number to the client after the verification is passed;

a dynamic verification unit, configured to receive a signature random number sent from the client, and use the public key to decrypt the signature random number to obtain a random number; and a digest verification unit, configured to in response to determining that the random number is consistent with the initial random number, acquire a message digest value of a client user name on the basis of determining that the random number is consistent with the initial random number, and in response to determining that the message digest value of the client user name is consistent with the standard message digest value, determine that the client passes the authentication on the basis of determining that the message digest value of the client user name is consistent with the standard message digest value.

In some embodiments, the initial setting unit includes:

a user login component, configured to input user information into an authentication management function of the hardware authentication certificate carrier, and log in to the authentication management function;

a key generation component, configured to generate a key pair including a private key and a public key by using the authentication management function, and store the private key into a storage medium of the hardware authentication certificate carrier;

a certificate generating component, configured to generate a user certificate by using a certificate generating tool according to the key pair;

a frequency setting component, configured to specify an administrator account of the hardware authentication certificate carrier, and set a maximum number of attempts for an administrator and a user to log in to the authentication management function.

In some embodiments, the certificate verifying unit includes:

a certificate matching component, configured to extract a user certificate from the authentication request, and judge whether the user certificate is a valid user certificate issued by a root certificate of a server end;

a password generating component, configured to in response to determining that the user certificate is a valid user certificate issued by the root certificate of the server end, and generate a random number with a specified number of digits on the basis of determining that the user certificate is a valid user certificate issued by the root certificate of the server end, send the random number to the client, and store the random number into a memory of the database server end as an initial random number; and a failure judging component, configured to in response to determining that the user certificate is not a valid user certificate issued by the root certificate of the server end, determine that an authentication fails on the basis of determining that the user certificate is not the valid user certificate issued by the root certificate of the server end.

According to a third aspect, the embodiments of the present disclosure provide a terminal, including a memory and one or more processors, wherein the memory stores computer readable instructions, when the computer readable instructions executed by the processors, make the one or more processors to execute the above method.

According to fourth aspect, the embodiments of the present disclosure provide a computer readable storage medium, the computer readable storage medium stores computer readable instructions, when the computer readable instructions executed by one or more processors, make the one or more processors to execute the above method of the various aspects.

BRIEF DESCRIPTION OF THE DRAWINGS

To describe the technical solutions in the embodiments of the present disclosure or in the existing technology more clearly, the following briefly describes the accompanying drawings required for describing the embodiments or the existing technology. Apparently, a person of ordinary skill in the art may still derive other accompanying drawings from these accompanying drawings without creative efforts.

DETAILED DESCRIPTION OF THE EMBODIMENTS

Figure 1:
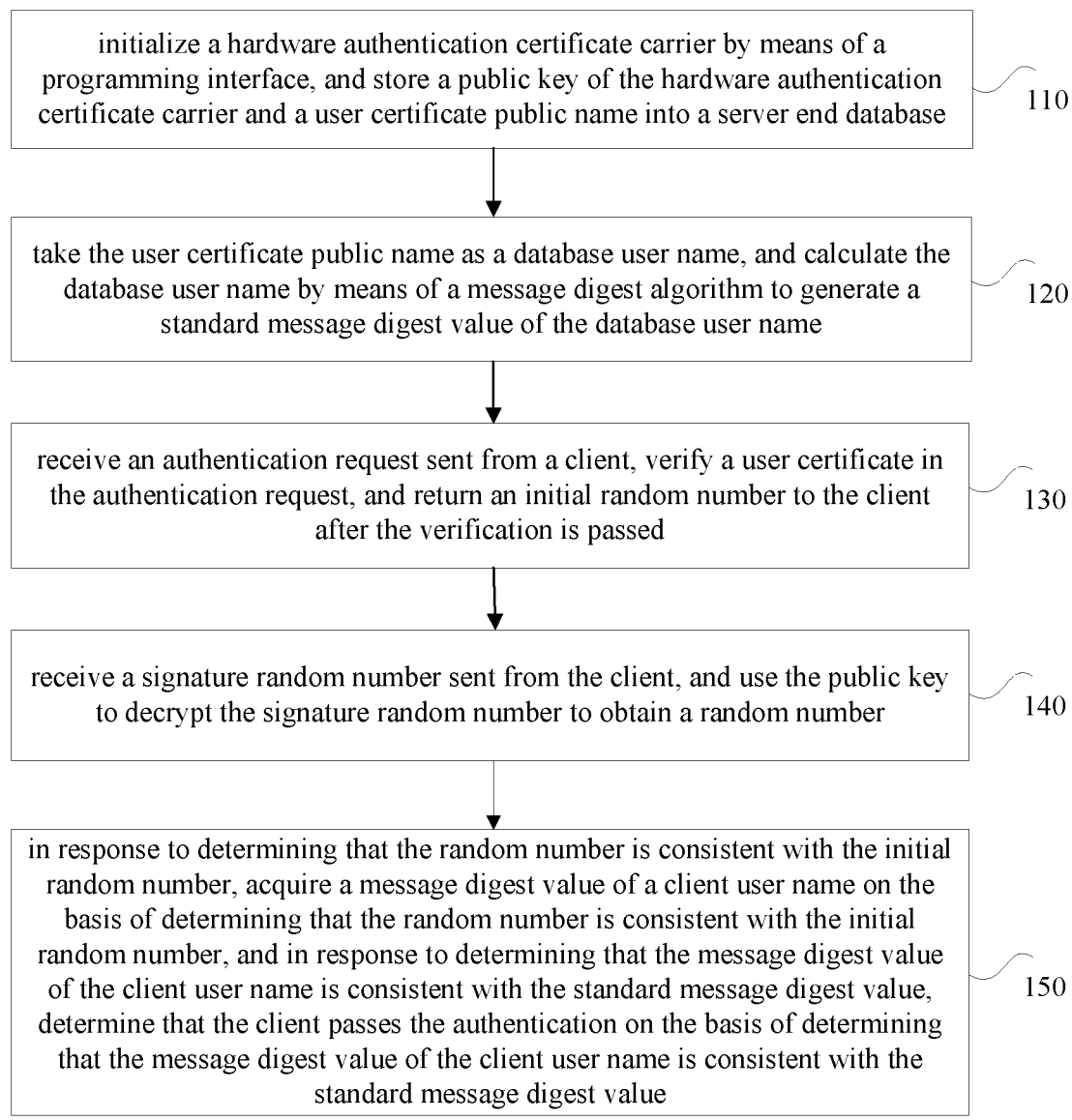
FIG. 1 is a schematic flowchart of a method of some embodiments of the present disclosure.

In order to make the technical solutions of the present disclosure better understood by those skilled in the art, the technical solutions in the embodiments of the present disclosure will be clearly and completely described below in combination with the drawings in the embodiments of the present disclosure. It is apparent that the described embodiments are not all embodiments but part of embodiments of the present disclosure. All other embodiments obtained by those of ordinary skill in the art on the basis of the embodiments in the present disclosure without creative work shall fall within the scope of protection of the present disclosure.

Key terms appearing in the embodiments of the present disclosure are explained below.

1) PostgreSQL Database

A PostgreSQL database is an object-relational database management system (ORDBMS) of free software with a wide range of features. The PostgreSQL supports most Structured Query Language (SQL) standards and provides many other modern characteristics, such as complex queries, foreign keys, triggers, views, transaction integrity, multi-version concurrency control, etc. Likewise, PostgreSQL may also be extended in many ways, such as by adding new data types, functions, operators, aggregation functions, indexing methods, procedural languages, etc. In addition, anyone may use, modify and distribute PostgreSQL for free for any purpose because of the flexibility of the license.

2) Identity Authentication

Identity authentication refers to a process of confirming the identity of an operator in a computer and a computer network system, so as to determine whether a user has the access and use permission of certain resources, thereby enabling an access policy of the computer and the network system to be reliably and effectively executed, preventing an attacker from counterfeiting a valid user to obtain the access permission for the resource, ensuring the security of the system and data, and authorizing the legitimate interests of the visitor.

3) USB Key

A USB Key is a hardware device with a USB interface, also known as a hardware digital certificate carrier, commonly referred to as a U disk or Youdun. A USB Key has built-in single chip or smart card chip, and has a certain storage space, the USB Key may store a private key and a digital certificate of a user, and uses a public key algorithm built in a USB Key to realize the authentication of a user identity. Since the private key of the user is stored in the password lock and may not be read theoretically in any way, the security of the user authentication is guaranteed.

4) PKCS #11 Standard

The PKCS #11 standard defines a platform-independent API for cryptographic tokens, such as a hardware security module (HSM) and a smart card, and names the API itself as "Cryptoki" (from "cryptographic token interface", phonetically as "crypto-key", but "PKCS #11" is commonly used to refer to an API and define its standard). API defines the most common type of cryptographic object (RSA key, x.509 certificate, DES/triple DES key, etc.) and all the functions required to use, create/generate, modify and delete these objects.

FIG. 1 is a schematic flowchart of a method of an embodiment of the present disclosure. The executor of FIG. 1 may be a database multi-authentication system, which may run in one or more servers.

As shown in FIG. 1, the method includes:

Step 110, initialize a hardware authentication certificate carrier by means of a programming interface, and store a public key of the hardware authentication certificate carrier and a user certificate public name into a server end database.

In some embodiments, a server running the database multi-authentication system initializes a hardware authentication certificate carrier by means of a programming interface, and stores a public key of the hardware authentication certificate carrier and a user certificate public name into the server end database.

Step 120, take the user certificate public name as a database user name, and calculate the database user name by means of a message digest algorithm to generate a standard message digest value of the database user name.

In some embodiments, a server uses the user certificate public name as a database user name, and calculates the database user name by means of a message digest algorithm to generate a standard message digest value of the database user name.

Step 130, receive an authentication request sent from a client, verify a user certificate in the authentication request, and return an initial random number to the client after the verification is passed.

In some embodiments, a server receives an authentication request sent from a client, verifies a user certificate in the authentication request, and returns an initial random number to the client after the verification is passed.

Step 140, receive a signature random number sent from the client, and use the public key to decrypt the signature random number to obtain a random number.

In some embodiments, a server receives a signature random number sent from the client, and uses the public key to decrypt the signature random number to obtain a random number.

Step 150, in response to determining that the random number is consistent with the initial random number, acquire a message digest value of a client user name on the basis of determining that the random number is consistent with the initial random number, and in response to determining that the message digest value of the client user name is consistent with the standard message digest value, determine that the client passes the authentication on the basis of determining that the message digest value of the client user name is consistent with the standard message digest value.

In some embodiments, a server in response to determining that the random number is consistent with the initial random number, a message digest value of a client user name on the basis of determining that the random number is consistent with the initial random number, and in response to determining that the message digest value of the client user name is consistent with the standard message digest value, determines that the client passes the authentication on the basis of determining that the message digest value of the client user name is consistent with the standard message digest value.

Figure 2:
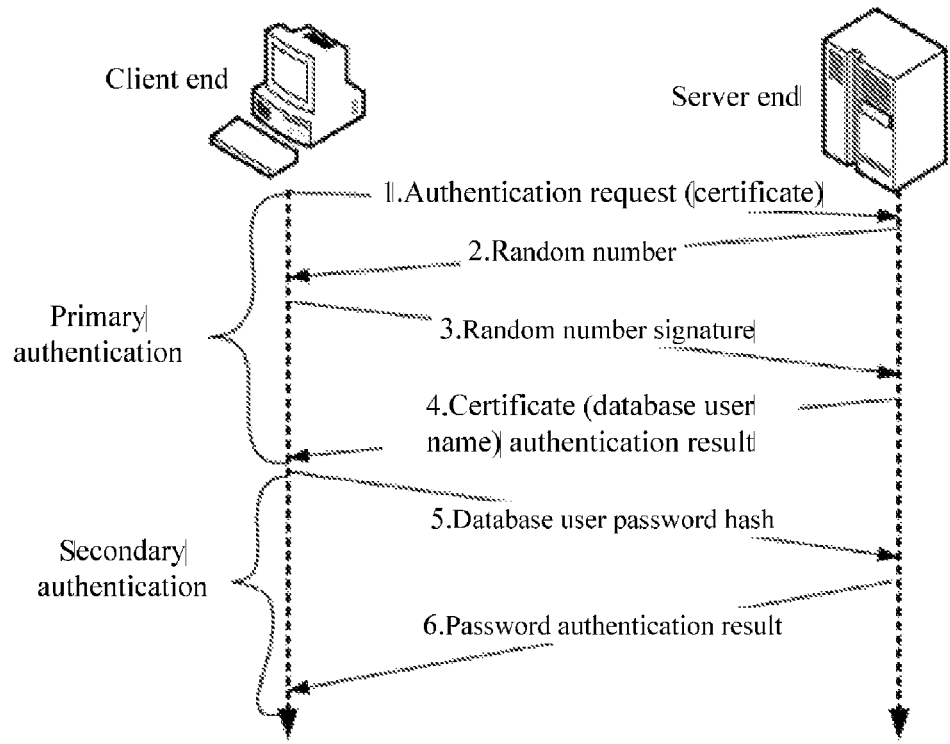
FIG. 2 is another schematic flowchart of a method of some embodiments of the present disclosure.

As shown in FIG. 2, the database multi-authentication method includes:

S1, a server running the database multi-authentication system initializes a hardware authentication certificate carrier by means of a programming interface, and stores a public key of the hardware authentication certificate carrier and a user certificate public name into the server end database.

During the implementation process, according to a user requirement, a database manufacturer performs initialization work on a hardware authentication certificate carrier by running a server of a database multi-authentication system. The method for initializing a hardware authentication certificate carrier includes the following steps:

1) the programming interface selected in the present disclosure is pkcs #11 (cryptoki); using a pkcs #11 library flow, first, initializing C_Initialize, acquiring the current connected slot information C_GetSlotList, opening a session C_OpenSession, acquiring token information C_GetTokeninfo, then using a user's pin to log in to C_Login, and then performing a corresponding operation (generating a key pair, signing, encrypting, reading a certificate in a key, and writing the certificate), and after the operations are completed, closing the session and exiting;

2) providing a user needing to use a database with a USB key, wherein the key includes a pair of rsa keys which are generated through an interface C_GnerateKeyPair of pkcs #11, so as to ensure that a private key does not leave the key, a personal digital certificate generated by this key pair is also included;

3) initializing a key by calling C_initToke, specifying the name of the key, inputting the key's administrator pin (SO pin), and setting the user pin; setting a maximum number of attempts of the administrator pin and the user pin, and dividing the sizes of a public storage area and a hidden storage area in the key;

4) calling C_GnerateKeyPair to generate a pair of rsa keys for a user using the key, and storing the pair of keys in the key, so as to ensure that the private key does not leave the key; then using the pair of keys to create a user's certificate, wherein the idea of creating a certificate is to generate a user certificate request by using a tool, and then sending the certificate request to a CA for signing to become a user certificate, in order to create a certificate request by using a key pair generated in the key, a certificate request generation tool of openss1 is required to modify a processing flow thereof, and a public key and a corresponding private key which are required for generating the certificate request are acquired by accessing usb_key through a library of pkcs #11, so as to use the private key to perform signature;

5) then submitting the generated certificate request to the CA signature to generate a certificate, and writing the generated digital certificate back to the usb_key, in this way, the usb_key for identity authentication of the PostgreSQL client is initialized, and may be delivered to the user.

The server stores the public key, the user certificate, and the user certificate public name which are generated in the initialization process, into the server database.

S2, taking the user certificate public name as a database user name, and generating a standard message digest value of the database user name.

The server takes the user certificate public name as a database user name, and uses Message-Digest Algorithm 5 (MD5) to calculate an MD5 value of the database user name as an initial MD5 value, wherein the initial MD5 value is a standard message digest value of the database user name.

S3, receiving an authentication request sent from a client, verify a user certificate in the authentication request, and returning an initial random number to the client after the verification is passed.

A client determines whether usb_key is connected, a user inputs a pin code; and in response to the pin code passes verification, an authentication request is sent to the server, the authentication request including a certificate of the user.

The server verifies the authenticity of the user certificate in the authentication request, and in response to the user certificate is a valid user certificate, the certificate authentication is passed; and the server generates a random number, and encrypts the random number by using a certificate public key and sends same to the client. At the same time, the random number is saved as an initial random number.

S4, receiving a signature random number sent from the client, and using the public key to decrypt the signature random number to obtain a random number.

The client submits the random number sent by the server to the usb_key for decryption and signature, and then sends the random number to the server for authentication.

The server verifies the random number signed by the client by using the public key of the certificate, and compares the decrypted random number with the initial random number; in response to the decrypted random number and the initial random number are consistent, that is, in response to the decrypted random number is a random number sent by the server, the authentication is passed, in response to the decrypted random number is not a random number sent by the server, the authentication fails.

S5, in response to determining that the random number is consistent with the initial random number, acquiring a message digest value of a client user name on the basis of determining that the random number is consistent with the initial random number, and in response to determining that the message digest value of the client user name is consistent with the standard message digest value, determining that the client passes the authentication on the basis of determining that the message digest value of the client user name is consistent with the standard message digest value.

Upon receipt of the message that the certificate verification is passed, the client performs an operation of acquiring username and password of the client, and reads name from the USB Key. The server acquires the name read from the client and calculates the MD5 value of the name, and in response to the MD5 value is consistent with the initial MD5 value, then determines that the authentication request of the client has passed the authentication, and the database is successfully connected.

Some embodiments of the present disclosure provide a method for realizing the database multi-authentication by adding an authentication method of a hardware authentication certificate carrier (USB Key) and combining with MD5 password authentication. With regard to an identity authentication function of a PostgreSQL database, the method provided in the present disclosure adds an authentication method for a usb key, and in conjunction with usb key authentication and MD5 authentication, the security of a database and the confidentiality of a user are increased.

Figure 3:
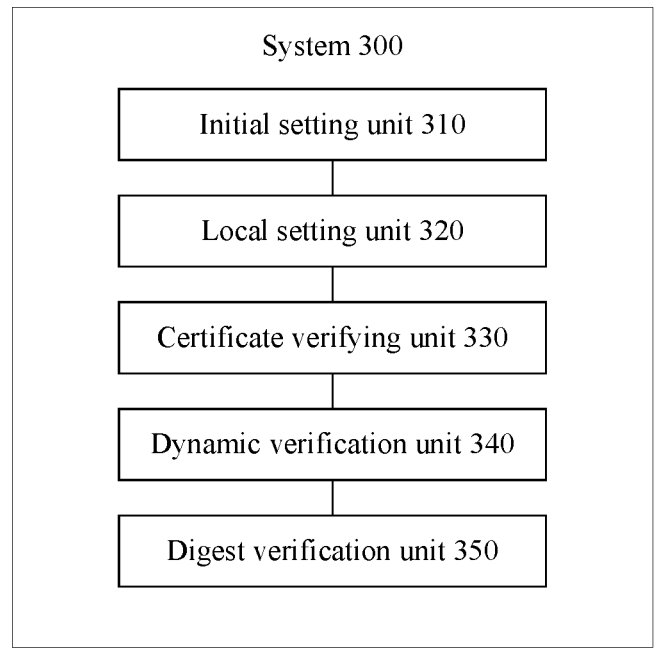
FIG. 3 is a schematic block diagram of a system according to some embodiments of the present disclosure.

As shown in FIG. 3, the system 300 includes:
an initial setting unit 310, configured to initialize a hardware authentication certificate carrier by means of a programming interface, and store a public key of the hardware authentication certificate carrier and a user certificate public name into a server end database;

a local setting unit 320, configured to take the user certificate public name as a database user name, and calculate the database user name by means of a message digest algorithm to generate a standard message digest value of the database user name;

a certificate verifying unit 330, configured to receive an authentication request sent from a client and verify a user certificate in the authentication request, and return an initial random number to the client after the verification is passed;

a dynamic verification unit 340, configured to receive a signature random number sent from the client, and use the public key to decrypt the signature random number to obtain a random number; and a digest verification unit 350, configured to in response to determining that the random number is consistent with the initial random number, acquire a message digest value of a client user name on the basis of determining that the random number is consistent with the initial random number, and in response to determining that the message digest value of the client user name is consistent with the standard message digest value, determine that the client passes the authentication on the basis of determining that the message digest value of the client user name is consistent with the standard message digest value.

In some embodiments, the initial setting unit includes:
a user login component, configured to input user information into an authentication management function of the hardware authentication certificate carrier, and log in to the authentication management function;

a key generation component, configured to generate a key pair including a private key and a public key by using the authentication management function, and store the private key into a storage medium of the hardware authentication certificate carrier;

a certificate generating component, configured to generate a user certificate by using a certificate generating tool according to the key pair;

a frequency setting component, configured to specify an administrator account of the hardware authentication certificate carrier, and set a maximum number of attempts for an administrator and a user to log in to the authentication management function.

In some embodiments, the certificate verifying unit includes:

a certificate matching component, configured to extract a user certificate from the authentication request, and judge whether the user certificate is a valid user certificate issued by a root certificate of a server end;

a password generating component, configured to in response to determining that the user certificate is a valid user certificate issued by the root certificate of the server end, and generate a random number with a specified number of digits on the basis of determining that the user certificate is a valid user certificate issued by the root certificate of the server end, send the random number to the client, and store the random number into a memory of the database server end as an initial random number; and a failure judging component, configured to in response to determining that the user certificate is not a valid user certificate issued by the root certificate of the server end, determine that an authentication fails on the basis of determining that the user certificate is not the valid user certificate issued by the root certificate of the server end.

Some embodiments of the present disclosure provide a system for realizing database multi-authentication by adding an authentication method of a hardware authentication certificate carrier (USB Key) and combining with MD5 password authentication. With regard to an identity authentication function of a PostgreSQL database, the system adds an authentication method for a usb key, and in conjunction with usb key authentication and MD5 authentication, the security of a database and the confidentiality of a user are increased.

Various components in the database multi-authentication system may be implemented in whole or in part by software, hardware and a combination thereof. The foregoing components may be embedded in or independent of a processor in a server in a hardware form, and may also be stored in a memory in the server in a software form, so that the processor calls and executes operations corresponding to the foregoing components.

The terms "assembly", "component" and "system" and etc. used in the present disclosure are intended to refer to a computer-related entity, which may be hardware, a combination of hardware and software, software, or software in execution. For example, an assembly may be, but is not limited to, a process running on a processor, a processor, an object, executable codes, an executing thread, a program, and/or a computer. By way of illustration, both the applications running on a server and the server may be assemblies. One or more assemblies may reside within a process and/or thread of execution, and an assembly may be localized on one computer and/or distributed between two or more computers.

Figure 4:
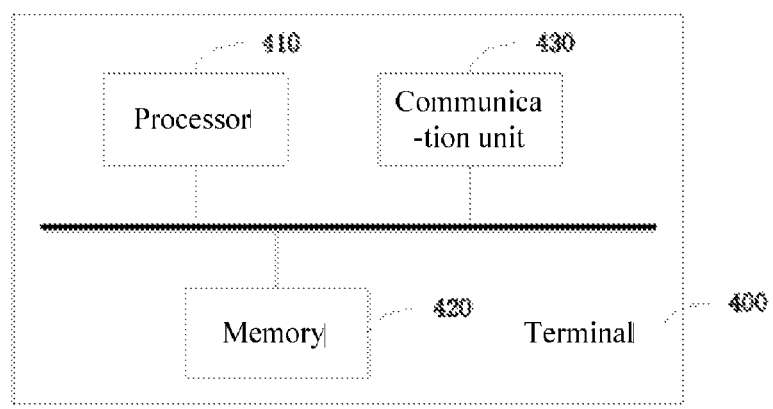
FIG. 4 is a schematic structural diagram of a terminal according to some embodiments of the present disclosure.

FIG. 4 is a schematic structural diagram of a terminal 400 provided by an embodiment of the present disclosure. The terminal 400 may be configured to execute the database multi-authentication method provided by the embodiments of the present disclosure.

The terminal 400 may include a processor 410, a memory 420, and a communication unit 430. These assemblies perform communication by using one or more buses. A person skilled in the art may understand that a structure of the terminal device shown in the figure constitutes no limitation on the present disclosure, and the structure of the terminal device may be a bus structure or a star structure, and may include more or fewer components than those shown in the figure, or a combination of some components, or a different arrangement of components.

The memory 420 may be configured to store an execution instruction of the processor 410, the memory 420 may be implemented by any type of transitory or non-transitory storage terminal or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk. When the execution instruction in the memory 420 is executed by the processor 410, the terminal 400 is caused to execute a part or all of the steps in the foregoing method embodiments.

The processor 410 is a control center of the storage terminal, is connected to various parts of the whole electronic terminal by using various interfaces and lines, and executes various functions of the electronic terminal and/or processes data by running or executing a software program and/or a component stored in the memory 420 and calling data stored in the memory. The processor may be formed by an integrated circuit (IC), for example, may be formed by a single packaged IC, and may also be formed by connecting a plurality of packaged IC having the same function or different functions. For example, the processor 410 may include a central processing unit (CPU). In the embodiments of the present disclosure, the CPU may be a single computing core, or may include a plurality of computing cores.

The communication unit 430 is configured to establish a communication channel, so that the storage terminal may communicate with other terminals, and receive user data sent by another terminal or send user data to another terminal.

The present disclosure further provides a computer storage medium. The computer storage medium may store a program. When the program is executed, part or all of the steps of the embodiments provided in the present disclosure may be included. The storage medium may be a magnetic disk, an optical disk, a read-only memory (ROM) or a random access memory (RAM).

Therefore, in the present disclosure, the database multi-factor authentication is achieved by adding an authentication method for a hardware authentication certificate carrier (USB Key) and combining same with MD5 password authentication. With regard to an identity authentication function of a PostgreSQL database, the present disclosure adds an authentication method for a usb key, and in conjunction with usb key authentication and MD5 authentication, the security of a database and the confidentiality of a user are increased. For the technical effect that may be achieved by the present embodiment, reference may be made to the description above, and it will not be repeated here.

Those skilled in the art may clearly understand that the technologies in the embodiments of the present disclosure may be implemented by means of software plus a necessary general hardware platform. Based on this understanding, the technical solution of the embodiments of the present disclosure essentially or the part that contributes to the prior art may be embodied in the form of a software product, and the computer software product is stored in a storage medium, such as a USB flash disk, a removable hard disk, a read-only memory (ROM), a random access memory (RAM), a magnetic disk, or an optical disk that may store program codes, and includes several instructions to make a computer terminal (which may be a personal computer, a server, or a second terminal, a network terminal, etc.) execute all or a part of the steps of the method in the embodiments of the present disclosure.

For the same or similar parts of the embodiments in the description, reference may be made to these embodiments. Terminal embodiments are basically similar to a method embodiment, and therefore are described briefly; for related parts, reference may be made to descriptions in the method embodiment.

In the several embodiments provided in the present disclosure, it should be understood that the disclosed system and method may be implemented in other ways. For example, the system embodiments described above are merely exemplary. For example, division of the units is merely logical function division, and may be other division in actual implementation. For example, a plurality of units or assemblies may be combined or integrated into another system, or some features may be ignored or not executed. In addition, the displayed or discussed mutual couplings or direct couplings or communication connections may be implemented by using some interfaces. The indirect couplings or communication connections between the systems or units may be implemented in electronic, mechanical, or other forms.

The units described as separate components may or may not be physically separated, and the components displayed as units may or may not be physical units, that is, may be located in one place, or may be distributed to a plurality of network units. Some or all units may be selected according to the actual needs to achieve the purpose of the embodiments of the present disclosure.

In addition, functional units in the embodiments of the present disclosure may be integrated into one processing unit, or the units may exist alone physically, or two or more units are integrated into one unit.

Although the present disclosure is described in detail with reference to the drawings and preferred embodiments, the present disclosure is not limited thereto. A person of ordinary skill in the art may make various equivalent modifications or replacements to the embodiments of the present disclosure without departing from the spirit and essence of the present disclosure, and these modifications or replacements should belong to the scope of protection of the present disclosure/a person skilled in the art would have readily conceived of variations or replacements within the technical scope disclosed in the present disclosure, and the variations or replacements shall all belong to the scope of protection of the present disclosure. Thus, the scope of protection of the present disclosure shall be subject to the scope of protection of the claims.

The invention claimed is:

1. A database multi-authentication method, applied to a server, comprising:
   initializing a hardware authentication certificate carrier by means of a programming interface,
   and storing a public key of the hardware authentication certificate carrier and a user certificate public name, the hardware authentiction certificate carrier is a hardware device with a Universal Serial Bus (USB) interface;
   taking the user certificate public name as a database user name, and generating a standard message digest value of the database user name;
   receiving an authentication request sent from a client and verifying a user certificate in the authentication request, and returning an initial random number to the client after the verification is passed; and
   receiving a signature random number sent from the client, and using the public key to decrypt the signature random number to obtain a random number; in response to determining that the random number is consistent with the initial random number, acquiring a message digest value of a client user name, and in response to determining that the message digest value of the client user name is consistent with the standard message digest value, determining that the client passes the authentication, wherein the client submits, via the USB interface, the initial random number sent by the server to the hardware authentication certificate carrier for signature, and then send the signate random number to the server for authentication.

2. The method as claimed in claim 1, wherein initializing the hardware authentication certificate carrier by means of a programming interface comprises:
   inputting user information into an authentication management function of the hardware authentication certificate carrier, and logging in to the authentication management function;
   generating a key pair comprising a private key and a public key by using the authentication management function, and storing the private key into a storage medium of the hardware authentication certificate carrier;
   generating a user certificate by using a certificate generating tool according to the key pair;
   specifying an administrator account of the hardware authentication certificate carrier, and setting a maximum number of attempts for an administrator and a user to log in to the authentication management function.

3. The method as claimed in claim 1, wherein the authentication request sent by the client comprises:
   identifying, by the client, the hardware authentication certificate carrier;
   inputting, by the client, the user information into the hardware authentication certificate carrier to log in to the hardware authentication certificate carrier;
   reading, by the client, the user certificate from the hardware authentication certificate carrier, and generating the authentication request according to the user certificate.

4. The method as claimed in claim 1, wherein receiving the authentication request sent from the client, verifying the user certificate in the authentication request, and returning the initial random number to the client after the verification is passed comprise:

extracting a user certificate from the authentication request, and judging whether the user certificate matches local stored legitimate user certificate;

in response to determining that the user certificate matches local stored legitimate user certificate, generating a random number with a specified number of digits, and sending the random number to the client, and storing the random number into server as an initial random number; and in response to determining that the user certificate does not match local stored legitimate user certificate, determining that an authentication fails.

5. The method as claimed in claim 1, wherein in response to determining that the random number is consistent with the initial random number, acquiring the message digest value of the client user name comprises:

after verification of consistency between the random number and the initial random number is passed, acquiring a user certificate public name read by the client from the hardware authentication certificate carrier;

calculating a message digest value of the user certificate public name by using a message digest algorithm.

6. The method as claimed in claim 1, wherein initializing the hardware authentication certificate carrier by means of a programming interface comprises:

dividing a sizes of a public storage area and a hidden storage area in the hardware authentication certificate carrier.

7. A terminal, comprising a memory and one or more processors, wherein the memory stores computer readable instructions, when executed by the processors, make the one or more processors to:

initialize a hardware authentication certificate carrier by means of a programming interface, and store a public key of the hardware authentication certificate carrier and a user certificate public name, the hardware authentiction certificate carrier is a hardware device with a Universal Serial Bus (USB) interface;

take the user certificate public name as a database user name, and generate a standard message digest value of the database user name;

receive an authentication request sent from a client and verify a user certificate in the authentication request, and return an initial random number to the client after the verification is passed; and receive a signature random number sent from the client, and use the public key to decrypt the signature random number to obtain a random number; in response to determining that the random number is consistent with the initial random number, acquire a message digest value of a client user name, and in response to determining that the message digest value of the client user name is consistent with the standard message digest value, determine that the client passes the authentication, wherein the client submits, via the USB interface, the initial random number sent by a server to the hardware authentication certificate carrier for signature, and then send the signate random number to the server for authentication.

8. The terminal as claimed in claim 7, the one or more processors are configured to:

input user information into an authentication management function of the hardware authentication certificate carrier, and log in to the authentication management function;

generate a key pair comprising a private key and a public key by using the authentication management function, and store the private key into a storage medium of the hardware authentication certificate carrier;

generate a user certificate by using a certificate generating tool according to the key pair;

specify an administrator account of the hardware authentication certificate carrier, and set a maximum number of attempts for an administrator and a user to log in to the authentication management function.

9. The terminal as claimed in claim 7, wherein the authentication request sent by the client comprises:

identifying, by the client, the hardware authentication certificate carrier;

inputting, by the client, the user information into the hardware authentication certificate carrier to log in to the hardware authentication certificate carrier;

reading, by the client, the user certificate from the hardware authentication certificate carrier, and generating the authentication request according to the user certificate.

10. The terminal as claimed in claim 7, the one or more processors are configured to:

extract a user certificate from the authentication request, and judge whether the user certificate matches local stored legitimate user certificate;

in response to determining that the user certificate matches local stored legitimate user certificate, generate a random number with a specified number of digits, and send the random number to the client, and store the random number into server as an initial random number; and in response to determining that the user certificate does not match local stored legitimate user certificate, determine that an authentication fails.

11. The terminal as claimed in claim 7, the one or more processors are configured to:

after verification of consistency between the random number and the initial random number is passed, acquire a user certificate public name read by the client from the hardware authentication certificate carrier;

calculate a message digest value of the user certificate public name by using a message digest algorithm.

12. The terminal as claimed in claim 7, the one or more processors are configured to:

divide a sizes of a public storage area and a hidden storage area in the hardware authentication certificate carrier.

13. A non-transitory computer readable storage medium, storing computer readable instructions, wherein the computer readable instructions, when executed by one or more processors, make the one or more processors to:

initialize a hardware authentication certificate carrier by means of a programming interface, and store a public key of the hardware authentication certificate carrier and a user certificate public name, the hardware authentiction certificate carrier is a hardware device with a Universal Serial Bus (USB) interface;

take the user certificate public name as a database user name, and generate a standard message digest value of the database user name;

receive an authentication request sent from a client and verify a user certificate in the authentication request, and return an initial random number to the client after the verification is passed; and receive a signature random number sent from the client, and use the public key to decrypt the signature random number to obtain a random number; in response to determining that the random number is consistent with the initial random number, acquire a message digest value of a client user name, and in response to determining that the message digest value of the client user name is consistent with the standard message digest value, determine that the client passes the authentication, wherein the client submits, via the USB interface, the initial random number sent by a server to the hardware authentication certificate carrier for signature, and then send the signate random number to the server for authentication.

14. The non-transitory computer readable storage medium as claimed in claim 13, the one or more processors are configured to:
input user information into an authentication management function of the hardware authentication certificate carrier, and log in to the authentication management function;
generate a key pair comprising a private key and a public key by using the authentication management function, and store the private key into a storage medium of the hardware authentication certificate carrier;
generate a user certificate by using a certificate generating tool according to the key pair;
specify an administrator account of the hardware authentication certificate carrier, and set a maximum number of attempts for an administrator and a user to log in to the authentication management function.

15. The non-transitory computer readable storage medium as claimed in claim 13, wherein the authentication request sent by the client comprises:
identifying, by the client, the hardware authentication certificate carrier;
inputting, by the client, the user information into the hardware authentication certificate carrier to log in to the hardware authentication certificate carrier;
reading, by the client, the user certificate from the hardware authentication certificate carrier, and generating the authentication request according to the user certificate.

16. The non-transitory computer readable storage medium as claimed in claim 13, the one or more processors are configured to:
extract a user certificate from the authentication request, and judge whether the user certificate matches local stored legitimate user certificate;
in response to determining that the user certificate matches local stored legitimate user certificate, generate a random number with a specified number of digits, and send the random number to the client, and store the random number into server as an initial random number; and
in response to determining that the user certificate does not match local stored legitimate user certificate, determine that an authentication fails.

17. The non-transitory computer readable storage medium as claimed in claim 13, the one or more processors are configured to:
after verification of consistency between the random number and the initial random number is passed, acquire a user certificate public name read by the client from the hardware authentication certificate carrier;
calculate a message digest value of the user certificate public name by using a message digest algorithm.

18. The non-transitory computer readable storage medium as claimed in claim 13, the one or more processors are configured to:
divide a sizes of a public storage area and a hidden storage area in the hardware authentication certificate carrier.

\* \* \* \* \*